US008230016B1

(12) United States Patent
Pattan et al.

(10) Patent No.: US 8,230,016 B1
(45) Date of Patent: Jul. 24, 2012

(54) DETERMINING INTENT OF A RECOMMENDATION ON A MOBILE APPLICATION

(75) Inventors: Neha Pattan, Mountain View, CA (US); Jennifer W. Lin, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/271,079

(22) Filed: Oct. 11, 2011

(51) Int. Cl.
*G06F 15/16* (2006.01)

(52) U.S. Cl. ........... 709/204; 709/223; 709/219; 725/86

(58) Field of Classification Search .................. 709/204, 709/223, 219; 725/86
See application file for complete search history.

(56) References Cited

U.S. PATENT DOCUMENTS

| | | | | |
|---|---|---|---|---|
| 6,212,640 | B1 * | 4/2001 | Abdelnur et al. | 726/2 |
| 6,615,276 | B1 * | 9/2003 | Mastrianni et al. | 709/250 |
| 6,650,629 | B1 * | 11/2003 | Takahashi et al. | 370/335 |
| 2005/0071867 | A1 * | 3/2005 | Lipsky et al. | 725/34 |
| 2005/0071897 | A1 * | 3/2005 | Harberd et al. | 800/290 |
| 2010/0217670 | A1 | 8/2010 | Reis et al. | |
| 2010/0332330 | A1 | 12/2010 | Goel et al. | |

* cited by examiner

*Primary Examiner* — Tammy Nguyen
(74) *Attorney, Agent, or Firm* — Birch, Stewart, Kolasch & Birch, LLP

(57) ABSTRACT

Methods and systems are provided for determining the intent of a recommendation made by a user of a mobile application where the application includes a plurality of separable components, any one or more of which the recommendation can apply to. An application in which a user recommendation control is provided for presentation to a user also includes a tag indicating how a recommendation of the application should be interpreted with respect to the components included therein. The tag can be set by the application developer and can be in the form of text (e.g., a keyword or term) or a uniform resource locator (URL). Where a tag references multiple components of an application, a recommending user can be presented with a recommendation intent query. The recommendation intent query allows a user to designate one or more components of the application to which the user's recommendation should be attributed.

22 Claims, 9 Drawing Sheets

| User ID (505) | Recommended Content ID (510) | Intent (publisher provided) (515) |
| --- | --- | --- |
| User 1 | Ad 1 | Tag 1 |
| User 2 | Image 1 | Tag 2 |
| User 3 | Video 2 | Tag 3 |
| User 4 | Ad 2 | Tag 4 |
| User 5 | Image 2 | Tag 5 |

FIG. 5A

| User ID (520) | Recommended Content ID (525) | Intent (user selections) (530) |
| --- | --- | --- |
| User 1 | Ad 1 | Discount; Image Banner |
| User 2 | Image 1 | Volleyball |
| User 3 | Video 1 | Hawaii Location; Hotel "ABC" |
| User 4 | Ad 2 | Restaurant "D"; Pizza |

FIG. 5B

DETERMINING INTENT OF A RECOMMENDATION ON A MOBILE APPLICATION

FIELD OF THE INVENTION

The present disclosure generally relates to systems and methods for providing content to users. More specifically, aspects of the present disclosure relate to determining the intent of a user's interaction with social recommendation tools provided for presentation to the user in conjunction with an application containing content.

BACKGROUND

As mobile telephones, personal digital assistants, smartphones, and other similar portable user devices continue to grow more popular and more advanced in their functionalities, so does application software designed specifically for use with such devices. Mobile application software (also commonly referred to as "mobile applications" or "mobile apps") perform a seemingly endless number of tasks and functions for consumers (hereinafter referred to simply as "users") who choose to use them on their portable devices.

A user who finds a particular mobile application, such as a game or news provider service enjoyable may wish to make his or her appreciation of the application known to one or more other users (e.g., in a social network of the user, or publicly). Accordingly, the user may make a recommendation of the mobile application that other users can see when they are presented with an opportunity to use (e.g., download, install, etc.) the application. However, such mobile applications often contain many different components, any one or more of which may be the underlying motivation for the user's recommendation.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

One embodiment of the present disclosure relates to a method comprising: receiving, at a server, a plurality of identifiers for an application running on a user device, each of the plurality of identifiers being associated with at least one of a plurality of components of the application; responsive to receiving the plurality of identifiers, generating at least one component reference table based on the plurality of identifiers, the at least one component reference table including, for each of the identifiers, the at least one component of the application associated with the identifier; receiving an indication that a user selected a user recommendation control in the application running on the user device, the indication including data corresponding to one of the identifiers received for the application; determining that the user recommended a component of the application based on the at least one component reference table and the data corresponding to the one of the identifiers; responsive to determining that the user recommended the component, generating at least one social annotation based on the component; and serving, via a network, the at least one social annotation to a second user device in a format suitable for presentation on the second user device.

In another embodiment, the indication that the user selected the user recommendation control is an indication that the user recommended the application, and the method further comprises: using the data corresponding to the identifier to determine a group of components of the application associated with the identifier; querying the user to select at least one of the group of components applicable to the recommendation; receiving from the user, in response to the query, a selection corresponding to at least one of the group of components; and generating at least one social annotation based on the selection received from the user.

In another embodiment, the step of querying the user to select at least one of the group of components applicable to the recommendation further comprises: in response to receiving the indication that the user recommended the application, generating a user interface screen identifying the group of components; and providing the user interface screen for presentation to the user.

In still another embodiment of the disclosure, the method further comprises: storing the at least one component reference table for the application; and mapping the at least one component associated with each of the identifiers included in the at least one component reference table to the application.

In yet another embodiment of the disclosure, the indication that the user selected the user recommendation control is an indication that the user recommended the application, and the method further comprises: generating a user interface screen based on the mapped components included in the at least one component reference table stored for the application, the user interface screen identifying the components of the application; and responsive to receiving the indication that the user recommended the application, using the user interface screen to query the user to select at least one of the components applicable to the recommendation.

In still another embodiment, the method further comprises serving, via the network, the at least one social annotation to the second user device in a format suitable for presentation on the second user device, the at least one social annotation identifying the at least one of the group of components of the application corresponding to the selection received from the user.

Another embodiment of the present disclosure relates to a system comprising at least one processor, and a computer-readable medium coupled to the at least one processor having instructions stored thereon which, when executed by the at least one processor, causes the at least one processor to: receive a plurality of identifiers for an application running on a user device, each of the plurality of identifiers being associated with at least one of a plurality of components of the application; responsive to receiving the plurality of identifiers, generate at least one component reference table based on the plurality of identifiers, the at least one component reference table including, for each of the identifiers, the at least one component of the application associated with the identifier; receive an indication that a user selected a user recommendation control in the application running on the user device, the indication including data corresponding to one of the identifiers received for the application; determine that the user recommended a component of the application based on the at least one component reference table and the data corresponding to the one of the identifiers; responsive to determining that the user recommended the component, generate at least one social annotation based on the component; and serve, via a network, the at least one social annotation to a second user device in a format suitable for presentation on the second user device.

In another embodiment where the indication that the user selected the user recommendation control is an indication that the user recommended the application, the at least one processor of the system is further caused to: use the data corresponding to the identifier to determine a group of components of the application associated with the identifier; query the user to select at least one of the group of components applicable to the recommendation; receive from the user, in response to the query, a selection corresponding to at least one of the group of components; and generate at least one social annotation based on the selection received from the user.

In another embodiment, the at least one processor of the system is further caused to, in response to receiving the indication that the user recommended the application, generate a user interface screen identifying the group of components; and provide the user interface screen for presentation to the user.

In still another embodiment of the disclosure, the at least one processor of the system is further caused to: store the at least one component reference table for the application; and map the at least one component associated with each of the identifiers included in the at least one component reference table to the application.

In yet another embodiment where the indication that the user selected the user recommendation control is an indication that the user recommended the application, the at least one processor of the system is further caused to: generate a user interface screen based on the mapped components included in the at least one component reference table stored for the application, the user interface screen identifying the components of the application; and responsive to receiving the indication that the user recommended the application, use the user interface screen to query the user to select at least one of the components applicable to the recommendation.

In another embodiment of the disclosure, the at least one processor of the system is further caused to: serve, via the network, the at least one social annotation to the second user device in a format suitable for presentation on the second user device, the at least one social annotation identifying the at least one of the group of components of the application corresponding to the selection received from the user.

Yet another embodiment of the present disclosure relates to a method comprising: receiving, at a server, an indication that a user selected a user recommendation control in an application running on a user device, the application including a plurality of components; traversing a view hierarchy of the application to determine a view of the application containing the selected user recommendation control; determining that the user recommended at least one of the plurality of components of the application based on the view of the application containing the selected user recommendation control; responsive to determining that the user recommended the at least one component of the application, generating at least one social annotation based on the at least one component; and serving, via a network, the at least one social annotation to a second user device in a format suitable for presentation on the second user device.

In another embodiment, the method further comprises: identifying a group of components of the application based on the view of the application containing the selected user recommendation control; querying the user to select at least one of the group of components applicable to the recommendation; receiving from the user, in response to the query, a selection corresponding to at least one of the group of components; and generating at least one social annotation based on the selection received from the user.

In still another embodiment, the step of querying the user to select at least one of the group of components applicable to the recommendation further includes: responsive to identifying the group of components based on the view of the application containing the selected user recommendation control, generating a user interface screen identifying the group of components; and providing the user interface screen for presentation to the user.

In still another embodiment, the method further comprises: identifying a plurality of views of the application based on the traversed view hierarchy, wherein each of the plurality of views contains at least one of the plurality of components of the application; generating at least one component reference table for the application, the at least one component reference table including, for each of the plurality of views, the at least one component of the application contained in the view; and storing the at least one component reference table generated for the application.

In yet another embodiment, the method further comprises mapping the at least one component contained in each of the plurality of views included in the at least one component reference table to the application running on the user device.

A further embodiment of the present disclosure relates to a system comprising at least one processor, and a computer-readable medium coupled to the at least one processor having instructions stored thereon which, when executed by the at least one processor, causes the at least one processor to: receive an indication that a user selected a user recommendation control in an application running on a user device, the application including a plurality of components; traverse a view hierarchy of the application to determine a view of the application containing the selected user recommendation control; determine that the user recommended at least one of the plurality of components of the application based on the view of the application containing the selected user recommendation control; responsive to determining that the user recommended the at least one component of the application, generate at least one social annotation based on the at least one component; and serve, via a network, the at least one social annotation to a second user device in a format suitable for presentation on the second user device.

Further scope of applicability of the present invention will become apparent from the Detailed Description given below. However, it should be understood that the Detailed Description and specific examples, while indicating preferred embodiments of the invention, are given by way of illustration only, since various changes and modifications within the spirit and scope of the invention will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

FIG. 5A is a chart illustrating example application recommendations made by users together with tags identifying the components associated with the recommendations according to one or more embodiments described herein.

FIG. 5B is a chart illustrating example application recommendations made by users together with components of the application identified by the users in response to a recommendation intent query according to one or more embodiments described herein.

Figure 1:
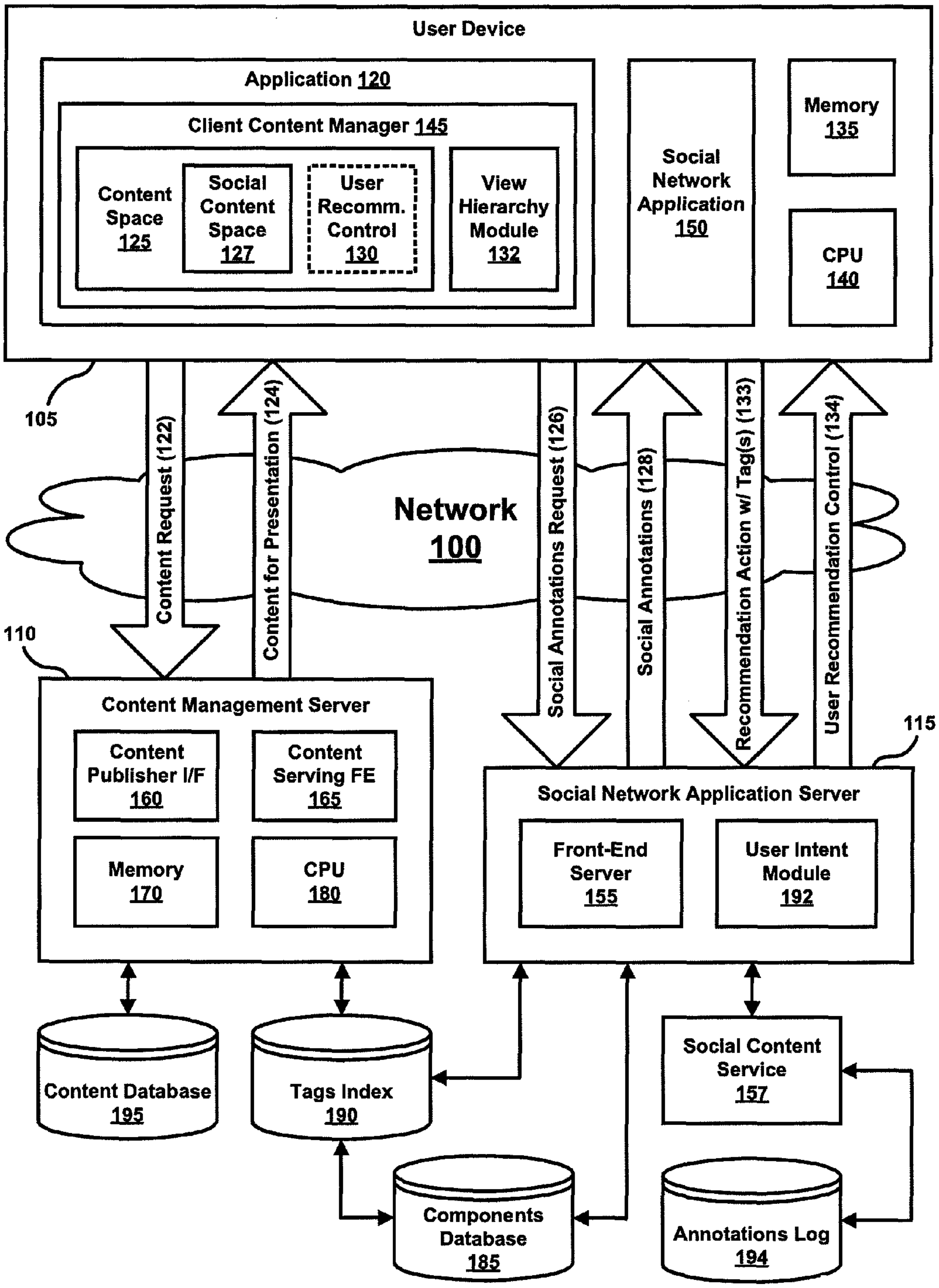
FIG. 1 is a block diagram illustrating an example content presentation system and surrounding environment in which various embodiments of the present disclosure may be implemented.

The headings provided herein are for convenience only and do not necessarily affect the scope or meaning of the claimed invention.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

Embodiments of the present disclosure relate to methods and systems for determining the intent of a recommendation made by a user of a software application running on a portable user device where the application includes a plurality of separable (e.g., distinguishable, separately identifiable, etc.) components and/or content, any one or more of which the recommendation can apply to or be attributed to. The software application may be, for example, a video or audio player, game, calendar, news service, etc., and the components and/or content of the application can include such things as a user interface of the video or audio player, one level of the game, a feature of the calendar, an image or joke in the news service, and the like. For purposes of brevity, a software application is sometimes referred to herein simply as an "application" or an "app." Additionally, in the context of a portable user device, a software application designed specifically for such a device is sometimes referred to herein as a "mobile application" or "mobile app," also for purposes of brevity.

A user in a social network (e.g., an online community or system that provides a forum for users who are in different geographic locations to interact with each other) may wish to indicate that he or she likes, approves, suggests, or enjoys a particular mobile application such that one or more other users in the social network will be made aware of this indication when they use (e.g., access) or are presented with the opportunity to use (e.g., view, download, install, etc.) the application. Accordingly, the user may make a recommendation of the application.

In at least some embodiments of the present disclosure, a user can recommend a mobile application by interacting with (e.g., selecting) a user recommendation control (e.g., widget, tool, point, button, etc.) provided for display to the user within the application. Depending on the implementation, this user recommendation control may be configured to allow a user to publish (e.g., make known to one or more other users in a social network and/or more broadly to the public in general) an opinion (e.g., emotion, reaction, perception, impression, view, etc.) that he or she has about the application.

According to some embodiments of the disclosure, a mobile application in which a user recommendation control is provided for presentation to and use by a user also includes at least one tag (or other similar type of metadata) that indicates how a recommendation of the application is to be interpreted. For example, a developer of a mobile application containing the user recommendation control may set a tag indicating that a recommendation of the application made by a user (e.g., by interacting with the user recommendation control) is to be attributed to a specific component of the application. In this manner, the intent of a user's recommendation of an application may be determined using the corresponding tag set for the application.

In at least one embodiment the tag set for an application may be in the form of text (e.g., a keyword or term) or a uniform resource locator (URL), either of which may be provided by a developer of the application or by some other party associated with the application.

One or more embodiments of the disclosure relate to providing a user with a recommendation intent query (also sometimes referred to as a "recommendation questionnaire") in response to the user indicating that he or she recommends a mobile application. The recommendation intent query allows for a determination to be made about the user's intent with regard to the recommendation. For example, where a user recommends an application (e.g., a news or information service) containing a number of separable components and/or content (e.g., an image, a video, an advertisement, a user chat interface, etc.), the recommendation intent query allows the user's recommendation to be refined such that the recommendation can be attributed to a particular one or more of the components and/or content. The components and/or content of the application are separable in the sense that they each contribute to the application as a whole in one or more ways.

In at least some arrangements the recommendation intent query is in the form of a user interface containing a list of components, content, properties, and characteristics of the recommended application, one or more of which the user may designate (e.g., select, indicate, identify, choose, etc.) as being the intended target(s) of his or her recommendation. The following descriptions of various embodiments and examples sometimes collectively refer to the components, content, characteristics, features, properties, etc., of a mobile software application as "application components" or simply "components," for purposes of brevity.

Another embodiment of the disclosure relates to a method and system for determining the intent of a user's recommendation of a mobile application by traversing a view hierarchy of the application to determine which component(s) or content(s) of the application a user recommendation control is located closest to. A user can make a recommendation of a mobile application by interacting with (e.g., selecting) a user recommendation control integrated with or otherwise contained in the application. As will be described in greater detail herein, one of the numerous layered views of the application (or more than one of the layered views in a scenario where multiple user recommendation controls are integrated into an application) contains the user recommendation control selected by the user to indicate the user's intention to make a recommendation. By identifying the application view containing the user recommendation control, a determination can be made about which one or more components of the application the recommendation applies to.

For example, a view hierarchy of an application can be traversed by asking for the parent view (sometimes also referred to as the "root view") of the view currently being focused on by the user (e.g., the view of the application (e.g., screen shot or image(s) being displayed on the screen) that the user indicates he or she wishes to recommend). In at least one implementation, various requests (e.g., get( ) requests, find( ) requests, etc.) can be made to determine the view with the current focus by the user (e.g., findFocus( )), the parent of the current view (e.g., getParent( )), and the topmost view in the current view hierarchy (e.g., getRootView( )) of the application being used. In another implementation, subviews and superviews properties may be provided for use in traversing the view hierarchy of an application. In such an implementation, a subviews property provides an array of subviews of the current view while a superviews property provides the parent view.

In either of the example implementations described above for traversing an application's view hierarchy, various information can be obtained including an application developer's view class name, top/left coordinates, and dimensions for the particular application. As will be further described below, such information allows a determination to be made about which view in an application is closest to a user recommendation control that is interacted with by a user to make a recommendation of content.

Additionally, one or more embodiments described herein relate to a method and system for verifying a user's recommendation of a mobile application is authentic and is accurately attributed to the intended components or content within that application. Such a verification system and process ensures that when a recommendation is made of an application running on a user device, the recommendation is in fact being made by an authorized user of the device, and not being made by a developer or some other third-party associated with the application on behalf of the user.

Furthermore, in a scenario where an application running on a user device includes a plurality of separable components, content, properties, and characteristics, the systems and methods described herein ensure that when a user intends his or her recommendation of the application to apply or be attributed to a specific one or more of such components, content, properties, and characteristics, this intention of the user is not distorted when the recommendation is communicated outside of the user device.

As will be described in greater detail below, the methods and systems of the present disclosure that relate to verifying a user's application recommendation include proxying application recommendation requests (e.g., indications that a user wishes to recommend an application running on a user device) through a social network application installed on the user's device and requiring the user to confirm all such actions. In this manner, a developer or other third-party associated with an application (e.g., a "malicious" application) cannot send application recommendation requests, and/or requests to undo application recommendations, on its own as if it were the user making such requests.

At least one embodiment described herein relates to parsing an application in which a user recommendation control is provided to identify the various components of the application that may be the intended target(s) of a user's recommendation. As will be further described below, the parsed application components may be used to create a database of application components that can be used (e.g., retrieved, referenced, etc.) to generate a recommendation intent query (e.g., recommendation questionnaire) for presentation to a user in response to the user making a recommendation of an application. In at least some implementations, the "parsing" of an application may be performed based on tags provided by a developer or other third-party associated with the application, or by traversing the view hierarchy of the application as described above. A particular application may be mapped to its respective parsed components contained in one or more component reference tables and/or stored in one or more databases for use in generating a recommendation intent query.

Other embodiments of the present disclosure relate to generating detailed social annotations for presentation with a recommended application based on a determination as to the user's intent for the recommendation. As used herein, a "social annotation" (also sometimes referred to as "social content" or "social network content") refers to content associated with an action of a user in a social network that is provided for presentation to other users in the social network in conjunction with a particular application to which the user's action was directed. For example, a user (e.g., "User 1") may indicate that he or she likes, approves, recommends, suggests, etc., a news service application. Examples of a detailed social annotation corresponding to such an indication by User 1 may be "User 1 likes the article about football" or "User 1 suggests the video about dogs," depending on what User 1 intended his or her recommendation of the news service application to be for.

According to at least one implementation, these detail social annotations may be generated based on a user's response to a recommendation intent query. For example, if a user designates a particular component of an application to which the user's recommendation of the application is to apply, then when that same application is used by (e.g., accessed) or provided for use (e.g., provided for installation or download) to other users in the user's social network (e.g., other users who are in some type of acquaintance relationship with the recommending user, such as the user's "connections," "friends," "circles," etc.), the application may be presented in conjunction with an annotation detailing the user's recommendation of the designated component.

The present disclosure contains some examples described in the context of advertisements. An advertisement is an entity (e.g., video, audio file, image, text, etc.) that presents a piece of information to a user and is designed to be used in whole or in part by the user. Ads can be provided (e.g., presented) to a user in electronic form, such as banner ads on a web page, as ads presented in a user interface associated with an application (e.g., a mobile application running on a portable user device), as ads presented with search results, as ads presented with emails, and the like. Such electronic ads may also contain links to other electronic content including web pages, images, audio files video files, etc. Advertisements may also be referred to as "promotional content" or one or more other similar such terms.

When a user makes a request for online content, such as a web page, a video/audio clip, a game, or other online resource, via an application running on a user device, one or more content requests can be initiated by the application to retrieve the requested content from content publishers for presentation to the user within the application. Examples of content publishers include publishers of web sites, search engines that publish search results in response to a query, and numerous other sources or parties that make information and/or experiences available for use by applications running on a user device. In some arrangements, one or more additional items of content, such as advertisements, may be provided along with the requested content.

In at least one scenario a user may be a member of a social network comprised of many other users, some of whom share a connection with the user or are in one of a variety of relations with the user. In such a social network context, a user may wish to recommend or suggest certain content, including advertisements, to one or more other social network users. In some scenarios this content may be a part of or contained within an application, including a mobile application running on a portable user device.

In at least some embodiments, the recommendation intent query provided for presentation to a user in response to receiving an indication that the user recommended an application can be overlaid on the application interface being displayed. Depending on the implementation, the recommendation intent query can list or otherwise identify various separable components of the particular application that was recommended by the user (e.g., via a user recommendation control provided for display within the application). For example, the recommendation intent query can list application components such as an image, a video, a user chat interface, etc., along with user-selectable checkboxes that can be used to designate one or more listed components as the intended target(s) of the recommendation.

It should be noted that the recommendation intent query described herein may be referred to in numerous other ways in addition to or instead of "recommendation intent query," without departing from its intended meaning and without limiting any of its features and/or functionalities. For example, the recommendation intent query may also be referred to as a "recommendation questionnaire," "user intent questionnaire," "user intent query", "user intent determination screen," as well as other identifiers, names and labels similar in nature to those mentioned. Irrespective of the term or phrase used to refer to the recommendation intent query, in the various embodiments described herein the recommendation intent query allows a user to designate (e.g., select, indicate, identify, choose, etc.) one or more components (e.g., subjects, characteristics, parts, features, properties, etc.) of an application to which the user's recommendation of the application applies or should otherwise be attributed.

It should also be noted that in any of the various scenarios in which the methods or systems described herein collect personal information about a user, the user may be given the option to not have his or her personal information collected and/or used in any way. For example, a user may be provided with an opportunity to opt in/out of programs or features that may collect personal information, such as information about the user's geographic location, preferences, and the like. Furthermore, certain user data may be rendered anonymous in one or more ways before being stored and/or used, such that personally-identifiable information is removed. For example, a user's identity may be made anonymous so that no personally-identifiable information can be determined or collected for the user. Similarly, a user's geographic location may be generalized in situations where location information is obtained (e.g., limited to a city, zip code, or state level) so that a particular location of a user cannot be determined.

FIG. 1 shows an example content presentation system and surrounding environment in which various embodiments described herein may be implemented. The example system and environment shown includes a user device 105, a content management server 110, and a social network application server 115. The example environment also includes a network 100, such as a local area network (LAN), a wide area network (WAN), the Internet, or a combination thereof. The network 100 connects the user device 105, the content management server 110, the social network application server 115, and can also connect additional devices and/or servers of the same or different type (not shown). The example system also includes a components database 185, a content database 195, a tags index 190, a social content service 157, and an annotations log 194. These and other components of the system and environment shown in FIG. 1 will be described in greater detail below.

The user device 105 can be any of a number of different electronic devices under control of a user and capable of requesting and receiving resources. As used herein, a resource is any data that can be provided over the network 100, and can be identified by a resource address associated with the resource. Examples of resources include images, video, HTML pages, content (e.g., words, phrases, images, etc.), embedded information such as meta-information and hyperlinks, and also embedded instructions, such as JavaScript scripts. Examples of the user device 105 can be one or more personal computers, telephones, personal digital assistants (PDAs), television systems, etc., that are capable of sending and receiving data over the network 100. The user device 105 can also be a portable user device, such as a laptop computer, tablet computer, mobile communication device (e.g., cell phone, smartphone), and the like, capable of also sending and receiving data over the network 100.

The user device 105 may include one or more applications 120, which in some embodiments may be third-party applications separate from (e.g., not associated or affiliated with) the social network application 150, the content management server 110, and the social network application server 115. These applications 120 can consist of software that runs on the user device 105 and performs certain functions or tasks for a user, such as providing user interfaces for messaging services or providing services related to games, videos, or music. An application, such as application 120, may also be a mobile application consisting of software designed to run on a mobile user device, such as a cell phone or smartphone. Some example types of applications include multimedia (e.g., video or audio players, graphic or image viewers, etc.), communication (e.g., news or information clients, messaging or e-mail clients, etc.), games, productivity (e.g., calculators, calendars, task managers, etc.), as well as numerous other categories and types.

The application 120 may also include a client content manager 145, designated content space 125, designated social content space 127, a user recommendation control 130, and a view hierarchy module 132. The content space 125 may be for the display of various types of content, such as advertisements related to web page content, video or audio content displayed within a player, web-based e-mail, and the like. The content space 125 may also include designated social content space 127, which may be for the display of relevant social network content, such as social annotations 128 provided to the user device 105 via a social network application 150 in response to the user device making a social annotations request 126. Additionally, the content space 125 may also be for the display of various user interaction tools, such as a user recommendation control 130 configured to allow a user to make a recommendation of content, including the application 120 containing the content, to other users in one or more social networks.

The user device 105 may also include one or more web browser tools (not shown) for viewing and interacting with web pages via a wired or wireless internet connection and/or via a mobile data exchange connection such as cellular, optical, near field communication, or some combination thereof. A web browser tool contained in the user device 105 may similarly include a client content manager 145, designated content space 125, social content space 127 for the display of content (e.g., ads, social annotations, etc.) related to the application, and a user recommendation control 130. In at least some embodiments, the user device 105 may also include a computer processing unit (CPU) 140, a memory 135, and a social network application 150. Further details regarding the social network application 150 and the user recommendation control 134 will be provided below.

Content publishers, such as advertisers, may directly or indirectly submit, log, maintain, and utilize information in the content management server 110. For example, content publishers may access and/or interact with the content management server 110 via a content publisher interface (I/F) 160. Additionally, depending on the implementation, content publishers may be able to access and/or interact with the content management server 110 in one or more other ways. In at least some embodiments, content publishers provide content items (e.g., ads) to the content management server 110 via the content publisher interface 160, and the content management server 110, in turn, provides these content items to the user device 105 for presentation 124 using various methods described in greater detail below. These items of content may be provided to the user device 105 in response to a content request 122 received at the content management server 110, where the content request may be for content to be displayed within the application 120 running on the user device 105.

In a scenario where the content request 122 is a request for advertising (e.g., promotional) content, then the content provided for presentation 124 may be in the form of graphical ads, such as banner ads, audio ads, video ads, still image ads, text-only ads, as well as ads combining one or more of any such forms. The content (e.g., ads) received at the content management server 110, and similarly provided for presentation 124 (e.g., on a display of the user device 105) may also include embedded information or data, including links to one or more web pages, meta-information, and/or machine-executable instructions.

Although the client content manager 145 is illustrated in FIG. 1 as being a part of the application 120, in some embodiments of the disclosure the client content manager 145 may be a logically separate unit from the application 120. Additionally, the client content manager 145 may become embedded within the application 120 and may form an integral part of the application 120. Similarly, in embodiments where the user device 105 contains one or more web browser tools (not shown), the client content manager 145 may be contained or embedded within such browser tools or instead be a logically separate unit. The client content manager 145 manages content for the application 120, including sending content requests 122 to the content management server 110 and receiving content from the content management server 110 for presentation on (e.g., a display (not shown)) of the user device 105. In at least one embodiment, the application 120 may request content directly from the content management server 110, and also receive requested content from the content management server 110.

The social network application 150 may be client software running on the user device 105. In at least some embodiments, the social network application 150 manages a user's personal identification information (e.g., a personal cookie) and data regarding the user's accounts, including a social networking account. In one example, a social networking account is unique to a user, and represents the user for purposes of the user interacting with the content management server 110 and the social network application server 115, as well as for social networking.

In one or more embodiments, the social network application server 115 includes front-end server 155 and user intent module 192. Either or both of the front-end server 155 and the user intent module 192 may be configured to exchange data and information with social content service 157. In some arrangements, the data and information exchanged between the front-end server 155 or the user intent module 192 and the social content service 157 may include social annotation information maintained in one or more social annotations logs 194. As will be further described below, the front-end server 155 may be configured to provide social annotations 128 from the social network application server 115 to the user device 105, which in some arrangements may be in response to a social annotations request 126 received at the social network application server 115 from the user device 105. Additionally, the user intent module 192 contained within the social network application server 115 may be configured to receive from the user device 105 a response to a recommendation intent query sent to the user device 105 when, for example, a user makes a recommendation of the application 120.

Furthermore, in some embodiments a developer or other third-party associated with an application (e.g., application 120) contained on the user device 105 may provide information to the social network application server 115 about one or more tags that can be used to identify various components of the application. In some arrangements one or more of these tags may be included in a recommendation action 133 sent from the user device 105 (e.g., from the social network application 150 contained on the user device 105) to the social network application server 115 (e.g., to the user intent module 192 contained within the social network application server 115). As will be further described below, the tag(s) sent along with such a recommendation action 133 may be used by the social network application server 115 to determine which component(s) of an application (e.g., application 120) a user's recommendation of the application applies to.

Furthermore, in one or more embodiments, the tag(s) sent along with a user's recommendation action 133 to the social network application server 115 may be used to generate a recommendation intent query. Such a recommendation intent query may be used to refine a user's recommendation of an application (e.g., application 120) and determine which one or more components of the application the user's recommendation should be attributed to.

In various embodiments described herein, content may be provided for presentation 124 in the application 120 running on the user device 105 in conjunction with a user recommendation control 134 and one or more social annotations 128. For example, the social network application server 115 (e.g., the front-end server 155 of the social network application server 115) may provide, for display along with (e.g., as an overlay on) content provided by the content management server 110, a user recommendation control 134 generated by a social content service 157. It should be noted that the user recommendation control 130 represented by broken lines within the client content manager 145 corresponds to the providing of the user recommendation control 134 from the social network application server 115 to the user device 105.

The social network application server 115 may be a web-application server, which is a front-end that hosts the social network application 150 running on the user device 105 and also the user recommendation control 134 provided to the user device 105 for inclusion in the application 120. The social network application server 115 may be configured to serve (e.g., via the front-end server 155 contained on the social network application server 115) the user recommendation control 134 and/or the social annotations 128 to the user device 105. Additionally, the social network application server 115 may be configured to exchange authentication credentials (e.g., content (e.g., ad) share tokens) and user information with the social content service 157 such that the social content service 157 retrieves social annotations and other related social content and information from annotations log 194 for use in rendering the user recommendation control 134.

In any of the embodiments of the present disclosure, conventional content and/or ad serving methods and systems may be utilized in conjunction with the various features described herein. Additionally, in at least some embodiments, the content management server 110 identifies one or more candidate content items (e.g., candidate ads) from the content database 195, selects a particular one of the candidate content items, and provides the selected candidate content item to the user device 105 for presentation (e.g., within a user interface associated with one or more applications 120) to a user. Depending on the implementation, the content management server 110 may conduct an auction (e.g., a "content auction" or an "ad auction") to determine which candidate content item will be selected for presentation.

In scenarios where the example content presentation system of FIG. 1 is implemented in a more content-specific context, such as selecting and presenting advertisements, the content management server 110 may be referred to as an "ad management server," the content publisher interface 160 referred to as an "advertiser publisher interface," and the content serving front-end 165 referred to as an "ad serving front-end" without limiting any of the features or capabilities of these components or of the overall system as described herein. It should also be understood that while the following description of various features of the content presentation system sometimes makes reference to advertisements and/or web pages, other forms of content, including other forms of sponsored content, may also be selected and provided in the content presentation system.

It should be noted that in any of the various scenarios in which the methods or systems described herein collect personal information about a user, the user may be given the option to not have his or her personal information collected and/or used in any way. For example, a user may be provided with an opportunity to opt in/out of programs or features that may collect personal information, such as information about the user's geographic location, preferences, and the like. Furthermore, certain user data may be rendered anonymous in one or more ways before being stored and/or used, such that personally-identifiable information is removed. For example, a user's identity may be made anonymous so that no personally-identifiable information can be determined or collected for the user. Similarly, a user's geographic location may be generalized in situations where location information is obtained (e.g., limited to a city, zip code, or state level) so that a particular location of a user cannot be determined.

Figure 2:
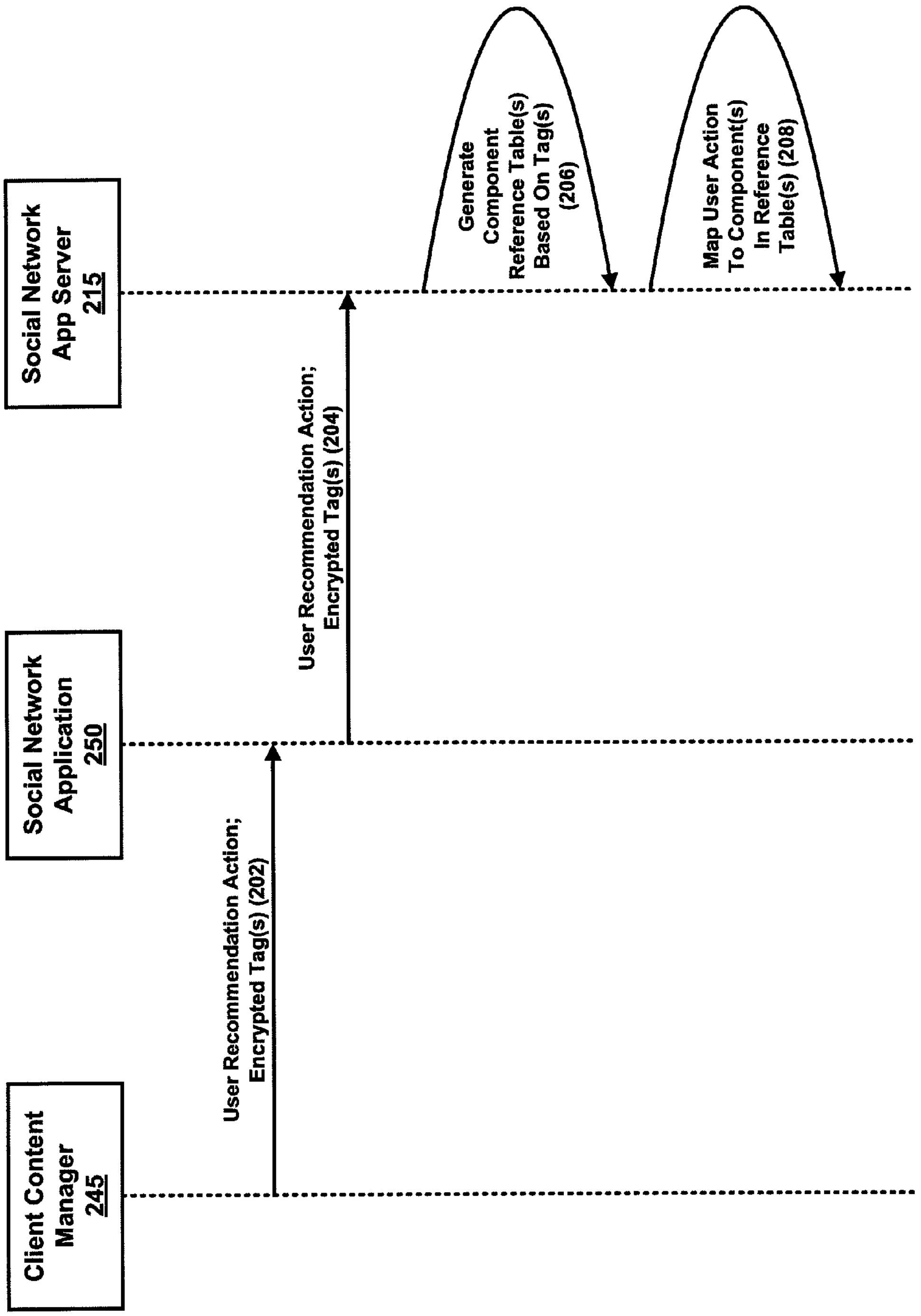
FIG. 2 is a data flow diagram illustrating example communications for determining the intent of an application recommendation using tags associated with components of the application according to one or more embodiments described herein.

FIG. 2 is a data flow diagram illustrating example communications for determining the intent of a user's recommendation of an application (e.g., application 120 shown in FIG. 1) by referring to tags (e.g., text, such as keywords or terms, or a URL) associated with components of the application. In at least some embodiments, an application containing a user recommendation control (e.g., application 120 containing user recommendation control 130 on user device 105 shown in FIG. 1) may have one or more tags set for the application, where each tag (which may also be referred to as an "identifier," a "marker," or other similar such term) is associated with, linked to, or otherwise references at least one component of the application.

For example, an application may include a number of different components (e.g., features, content, properties, etc.), some of which may be designed to enhance a user's experience or provide functionalities that the user will find useful. Examples of these components may include images, videos, text blocks, multiple views, user-interaction tools (e.g., a user chat screen), as well as numerous other types and variations of components in addition to or instead of those described.

In a scenario where such an application also contains a user recommendation control, a tag may be set associating one or more of the components with a recommendation of the application by a user. For example, a tag may be set indicating that if a user recommends the application (e.g., by selecting the user recommendation control), then the recommendation is to be applied to (e.g., attributed to, intended for, etc.) a particular video included in the application. In this manner a user's recommendation of an application comprised of many components can be refined such that the recommendation is applied or attributed to, or otherwise intended for a particular one or more of the many components.

Additionally, refining a user's recommendation of an application by using tags set for the application, as described above, allows for more detailed social annotations (e.g., social annotations 128 shown in FIG. 1) to be generated for presentation to one or more other users who access, download, or otherwise use the application. For example, in addition to generating a social annotation indicating that a user recommended a particular application (e.g., "User 1 recommends Application XYZ"), the systems and methods described herein provide for generating a social annotation indicating that the user recommended a specific one or more components of the application (e.g., "User 1 recommends the video shown in Application XYZ"). Depending on the implementation and the particular application at issue, the tag(s) for an application may be set (e.g., provided within the client content manager 145 shown in FIG. 1) by a developer of the application or by some other third-party associated with the application.

In the example communications shown in FIG. 2, client content manager 245 may send a user recommendation action with one or more encrypted tags 202 (e.g., tags associated with a particular application recommended by a user) to social network application 250, which, in turn, sends the recommendation action and tag(s) 204 to social network application server 215. The social network application server 215 may then generate one or more component reference tables based on the received tag(s) 206. In at least some embodiments, the component reference table(s) generated by the social network application server 215 may include, for each of the tags received, data corresponding to (e.g., identifying) one or more components of the application associated with the particular tag.

In at least some implementations, a user identifier (not shown in FIG. 2) may be sent to the social network application server 215 along with the user recommendation action and encrypted tag(s) 204. If a user identifier is sent with the user recommendation action and encrypted tag(s) 204, then the identifier may be encrypted as well. In such an implementation, either the social network application server 215, or a content management server (e.g., content serving front-end 165 of the content management server 110 shown in FIG. 1) may be configured to decrypt the user identifier to make a determination as to whether the relevant user has "opted-out" (e.g., elected not to receive) of content associated with a social network (e.g., "social content"), which is the type of content involved in at least some embodiments of the present disclosure.

For example, a user who does not wish to share his or her information, as well as information related to the user's friends within a social network of the user, may opt-out of receiving content (e.g., ads) accompanied by social network content (e.g., social annotations). In a scenario involving a user who has opted-out of social content, and thus chosen not to share his or her recommendations and suggestions, the user may or may not be presented with a recommendation intent query in response to making a recommendation, depending on the implementation involved.

After generating the one or more component reference tables based on the received tag(s) 206, the social network application server 215 may map the user recommendation action to one or more of the components contained in the component reference table(s) 208. According to some implementations, when a user recommends an application (e.g., application 120 shown in FIG. 1), the one or more components of that application mapped to such a recommendation action can be used as the basis for determining what the user's recommendation applies to (e.g., should be attributed to).

Figure 3:
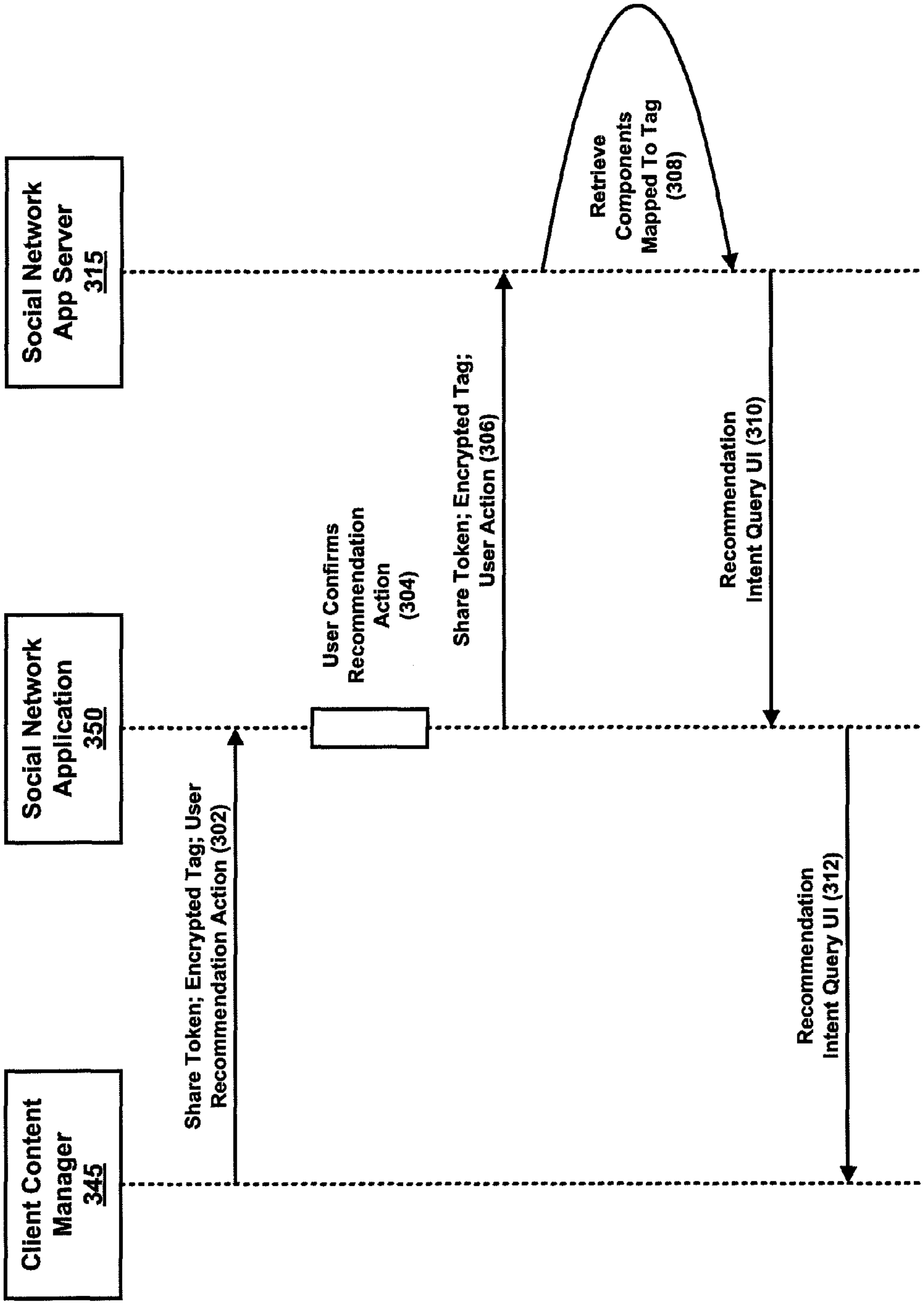
FIG. 3 is a data flow diagram illustrating example communications for refining an application recommendation by providing a user with a recommendation intent query according to one or more embodiments described herein.

FIG. 3 illustrates example communications, including data and information flows, for refining a recommendation of an application made by a user by providing the user with a recommendation intent query according to one or more embodiments described herein. As described above, in response to a user making a recommendation of an application (e.g., recommendation action with tag(s) 133 received at social network application server 115 shown in FIG. 1), the user may be presented with a recommendation intent query that allows the user to make a selection corresponding to one or more components of the application that the user intended his or her recommendation to be for.

Client content manager 345, which in at least some embodiments may be a client module that manages content for an application running on a user device (e.g., application 120 running on user device 105 shown in FIG. 1) including sending requests for content and receiving content for presentation within the application, may send a share token and an encrypted tag along with a user recommendation action (e.g., indication) 302 to social network application 350. In at least some embodiments a user recommendation action, which may be in the form of an indication that a user recommended an application, is an indication that the user selected a user recommendation control provided for presentation within the application (e.g., user recommendation control 130 contained within application 120 running on user device 105 shown in FIG. 1).

Upon receiving the share token, encrypted tag, and the user recommendation action 302, the social network application 350, which may be client software running on a user device, may request a user associated with the user device to confirm the recommendation action 304. In at least some embodiments, the social network application 350 may present the user with a confirmation request screen, such as that shown in the example user interface of FIG. 7. If the user confirms the recommendation action (or undo recommendation action) 304, then the social network application 350 sends the share token, the encrypted tag and the confirmed user action 306 to social network application server 315, where the tag (and in some implementations the share token) can be decrypted. For example, the social network application server 315 (or a social content service, such as social content service 157 shown in FIG. 1) may be configured to use authentication credentials for the user to decrypt the share token.

Once the social network application server 315 receives and decrypts the share token and the tag provided along with the confirmed user recommendation action 306, the social network application server 315 may retrieve one or more components mapped to the decrypted tag 308 associated with the recommended application. For example, the social network application server 315 may retrieve the components 308 (e.g., data corresponding to the components) for the application associated with the user recommendation action 302 from a components database (e.g., components database 185 shown in FIG. 1). The social network application server 315 may retrieve the application components from the components database by using the decrypted tag received with the user recommendation action and referencing a tags index (e.g., tags index 190 shown in FIG. 1).

After retrieving the data corresponding to the components 308 of an application recommended by a user, the social network application server 315 may generate and provide a recommendation intent query user interface (UI) 310 to the social network application 350. The social network application 350, in turn, provides the recommendation intent query UI 312 to the client content manager 345 for presentation to a user (e.g., the user who recommended the application associated with the user recommendation action (e.g., indication) 302). In at least some embodiments, the recommendation intent query UI 312 provided to the client content manager 345 contains list of components, content, properties, characteristics, etc. of the particular application recommended by the user. Additional details regarding various features of the recommendation intent query UI will be described below with reference to FIG. 7.

According to one or more embodiments of the present disclosure, the social network application server 315 may retrieve data corresponding to the components of an application recommended by a user from one or more component reference tables stored for the application, such as the example component reference tables shown in FIGS. 5A and 5B. The example component reference tables illustrated in FIGS. 5A and 5B will be described in greater detail below.

Figure 4:
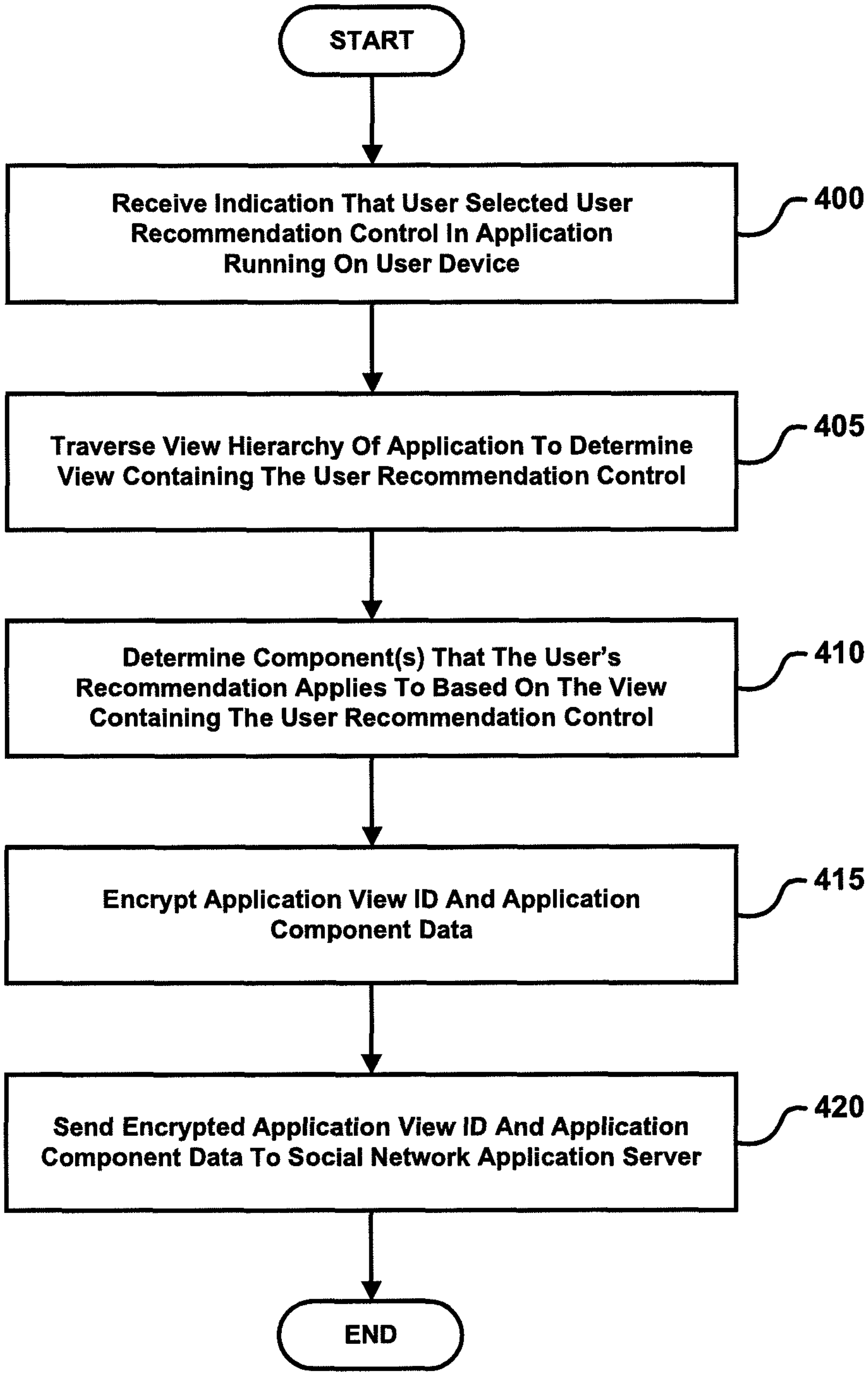
FIG. 4 is a flowchart illustrating a method for traversing a view hierarchy of an application to determine the intent of a recommendation of the application according to one or more embodiments described herein.

FIG. 4 is a flowchart illustrating a process of traversing a view hierarchy of a mobile application to determine the intent of a recommendation of the application made by a user according to one or more embodiments described herein.

The process begins at step 400 where an indication is received that a user selected a user recommendation control in an application running on a user device (e.g., user recommendation control 130 in application 120 running on user device 105 shown in FIG. 1). For example, a user can make a recommendation of a mobile application by interacting with (e.g., selecting, pressing, choosing, etc.) a user recommendation control integrated with, embedded within or otherwise contained in the application. In at least some embodiments, the indication may be received at a social network application server (e.g., social network application server 115 shown in FIG. 1), and may also be received from a social network application running on the user device (e.g., social network application 150 running on user device 105 shown in FIG. 1).

Once the indication is received in step 400, the process continues to step 405 where a view hierarchy of the application is traversed to determine the view of the application containing the user recommendation control. One of the numerous layered views of the application (or more than one of the layered views in a scenario where multiple user recommendation controls are contained in or otherwise integrated into an application) contains the user recommendation control that was selected by the user to indicate the user's intention to make a recommendation. As described herein, by identifying the application view containing the user recommendation control, a determination can be made about which one or more components of the application the recommendation was intended for.

In some embodiments, traversing the view hierarchy of the application (e.g., application 120 shown in FIG. 1) can be implemented using a view hierarchy module contained in the application (e.g., view hierarchy module 132 shown in FIG. 1). For example, in at least one arrangement, the view hierarchy of the application can be traversed in step 405 by the view hierarchy module asking the corresponding application for the parent view (sometimes also referred to as the "root view") of the view currently being focused on by the user (e.g., the view of the application (e.g., screen shot or image(s) being displayed on the screen) that the user indicates he or she wishes to recommend).

In at least one implementation, various requests (e.g., get( ) requests, find( ) requests, etc.) can be made to determine the view with the current focus by the user (e.g., findFocus( )), the parent of the current view (e.g., getParent( )), and the topmost view in the current view hierarchy (e.g., getRootView( )) of the application being used. In another implementation, subviews and superviews properties may be provided for use in traversing the view hierarchy of an application. In such an implementation, a subviews property provides an array of subviews of the current view while a superviews property provides the parent view.

In one or both of the example implementations described above for traversing an application's view hierarchy, as well as in numerous other similar implementations, various information can be obtained. Some examples of the type of information that can be obtained from initiating one or more of the requests described above include an application developer's view class name, top/left coordinates, and dimensions for the particular application. Such information allows a determination to be made about which view in the application either contains (or is closest to) the user recommendation control selected by the user to make a recommendation of the application, which generated the indication received in step 400.

The process continues to step 410 where a determination is made as to the one or more components of the application to which the user's recommendation applies to based on the view of the application containing (or located closest to) the user recommendation control selected by the user as described above. In at least one embodiment, the determination in step 410 may be made by using such information as the top/left coordinates and/or dimensions for the particular application. In step 415 of the process, an application view identifier (ID) and data corresponding to application components associated with the particular view are encrypted and then sent in step 420 to a social network application server (e.g., social network application server 115 shown in FIG. 1).

FIGS. 5A and 5B are tables that illustrate example components that may be identified for one or more applications (e.g., application 120 shown in FIG. 1) and used in generating a recommendation intent query for presentation to a user. In one or more embodiments, the example components included in the tables shown in FIGS. 5A and 5B may be identified based on tags (e.g., text, such as keywords or terms, or a URL) associated with the components, where the tags are received from a developer of the application in exchange for the application containing a user recommendation control (e.g., user recommendation control 130 shown in FIG. 1). In one or more other embodiments, the example components included in the tables may be identified by traversing a view hierarchy of the application, as described above with respect to the process shown in FIG. 4.

In at least some embodiments, the tables shown in FIGS. 5A and 5B may be application component reference tables or charts generated (e.g., by social network application server 115 shown in FIG. 1) based on received tags and/or traversed view hierarchies. Such component reference tables may be used to identify the separable components of a recommended application that are to be included in a recommendation intent query provided for presentation to a user in response to the user making a recommendation (e.g., selecting a user recommendation control provided for display to the user in the application).

Figure 6:
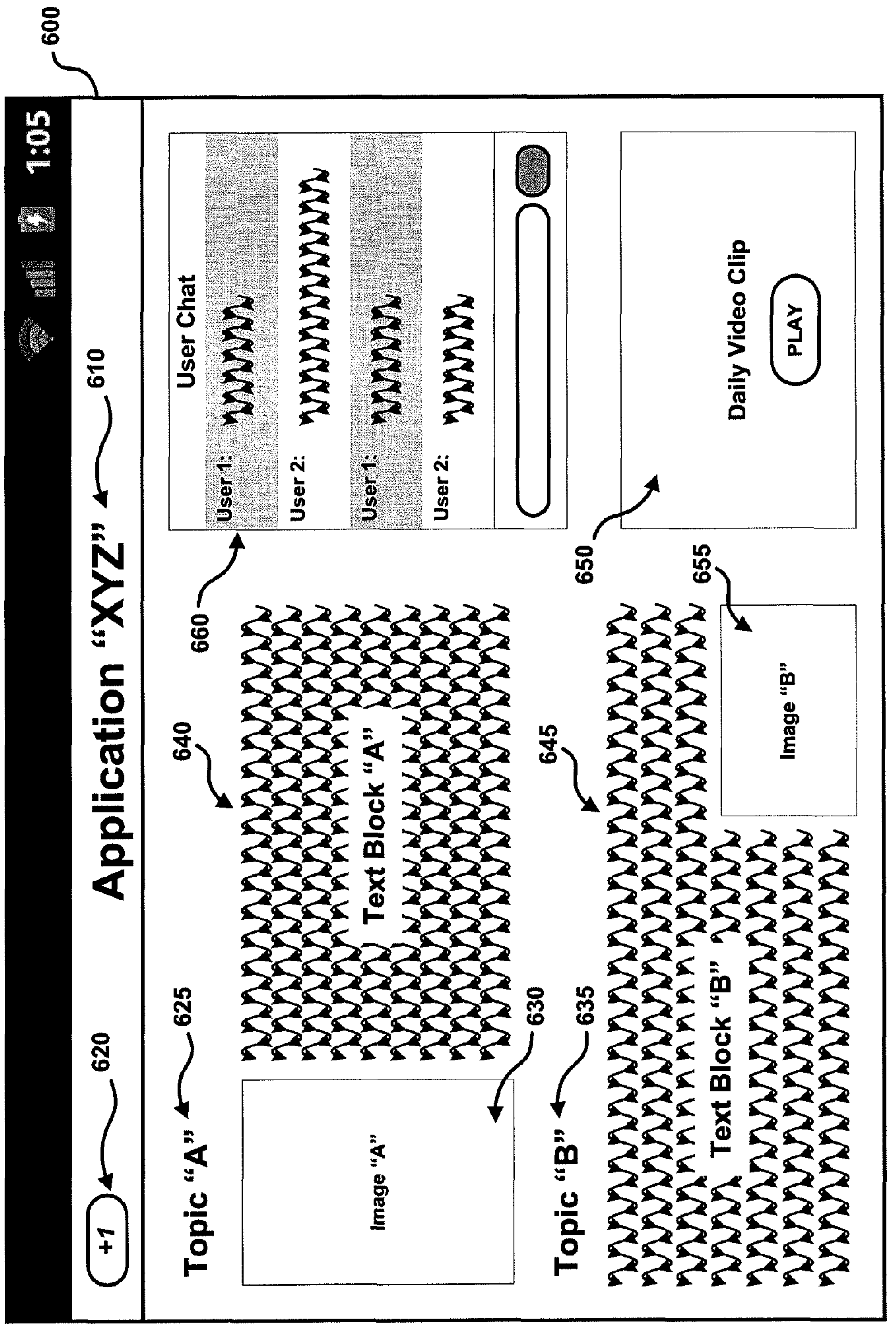
FIG. 6 is an example user interface that includes a mobile application containing various components along with a user recommendation control according to one or more embodiments described herein.
Figure 7:
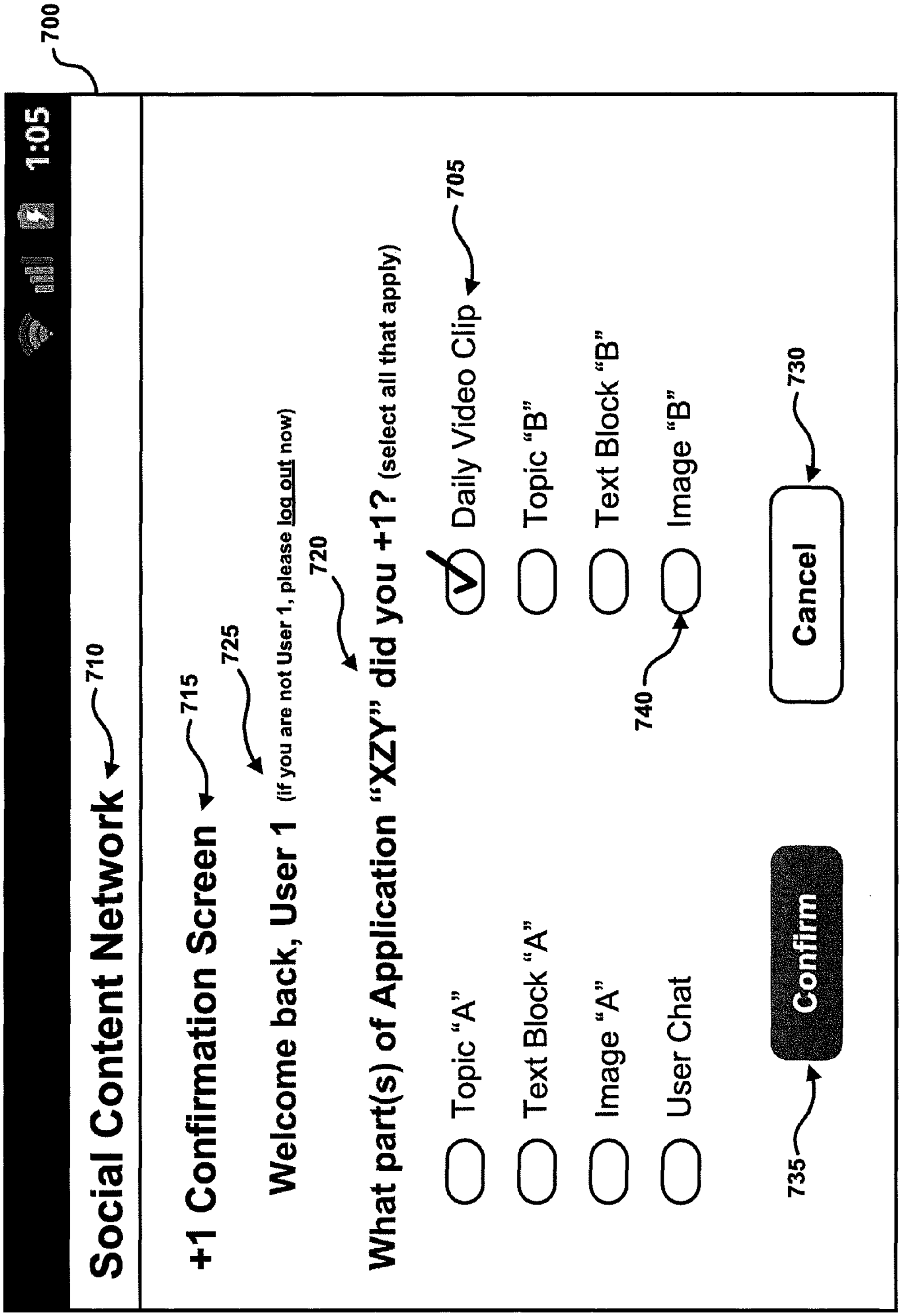
FIG. 7 is an example user interface that includes a recommendation intent query for a user to select one or more components of a mobile application that the user intended to recommend according to one or more embodiments described herein.
Figure 8:
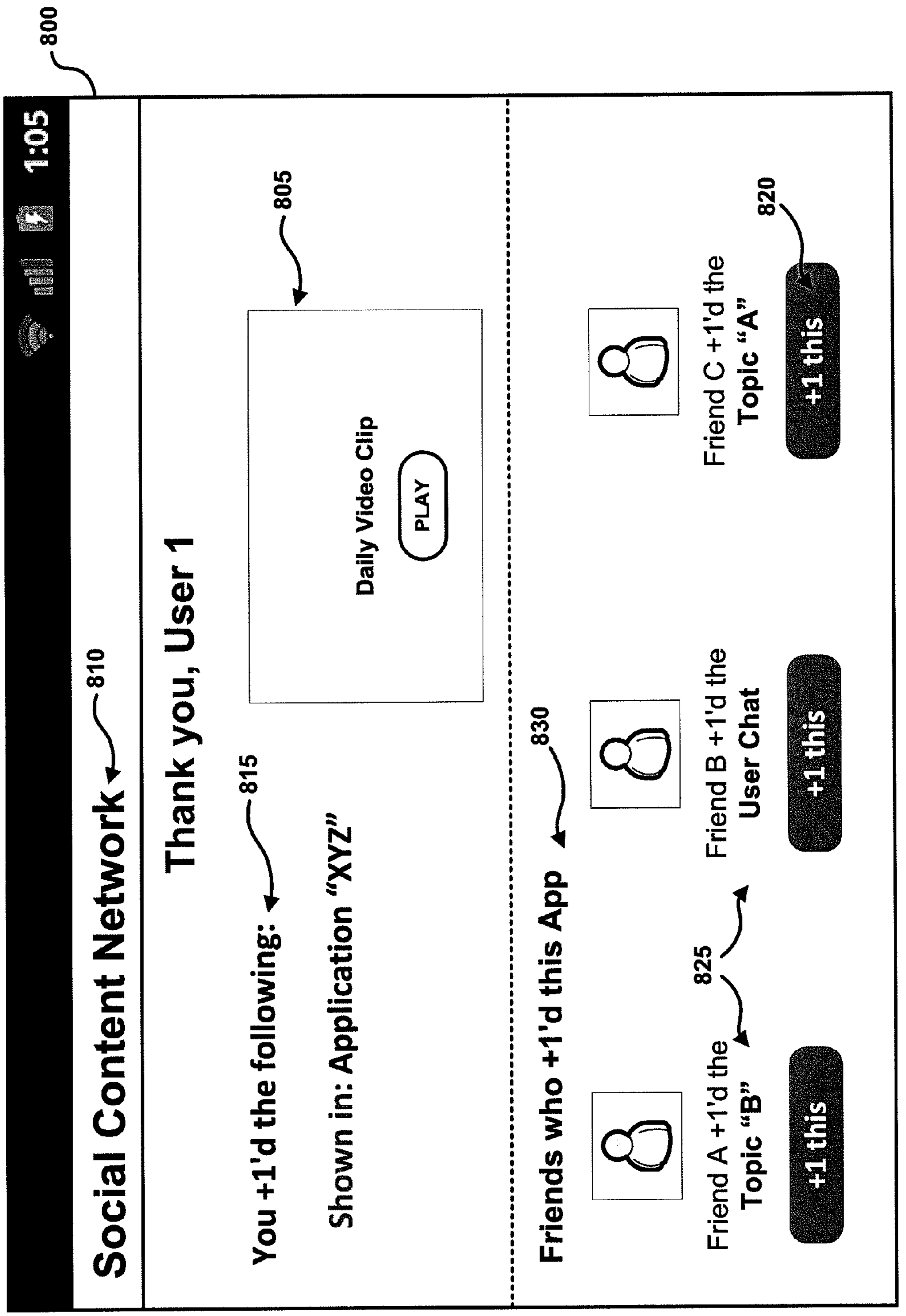
FIG. 8 is an example user interface that includes an application component recommendation made by a user and also identifies other users who have recommended components of the application according to one or more embodiments described herein.

FIGS. 6-8 illustrate example user interfaces that may be used in implementing any of the various methods and systems described herein. Various features and components of the illustrative user interfaces presented in FIGS. 6-8 are described in the context of an example scenario involving an Application "XYZ" 610 contained in user interface 600 of FIG. 6, where Application "XYZ" 610 includes multiple separable components. It should be understood that this particular scenario, including the example application, components, social network interfaces, and other content shown in FIGS. 6-8, are for illustrative purposes only, and are not in any way intended to limit the scope of the present disclosure.

FIG. 6 shows an example user interface 600, which in at least some scenarios may be a user interface for a mobile Application "XYZ" 610 running on a portable user device (e.g., application 120 of user device 105 shown in FIG. 1). A user recommendation control 620 is provided within the Application "XYZ" 610. As described above, according to some embodiments of the present disclosure, the user recommendation control 620 may be provided within the Application "XYZ" 610 to allow a user to make a recommendation (e.g., by interacting with the user recommendation control 620) of the application.

In at least the example user interface 600 illustrated in FIG. 6, the user recommendation control 620 is represented as a button with a "+1" symbol located in the middle of it. It should be understood that the user recommendation control 620 may be represented in numerous other ways in addition to or instead of the "+1" button shown in FIG. 6, and that the use of such an icon is not in any way intended to limit the scope of the disclosure. Application "XYZ" 610 is also shown to include a variety of separable components, including Topic "A" 625, Image "A" 630, Text Block "A" 640, Topic "B" 635, Text Block "B" 645, Image "B" 655, Daily Video Clip 650, and User Chat 660.

FIG. 7 shows an example user interface 700 that includes a recommendation confirmation request 715 associated with a social content network 710. In at least the example user interface 700, the recommendation confirmation request 715 is presented in conjunction with a recommendation intent query (or recommendation questionnaire) 720.

According to some embodiments of the disclosure, the recommendation confirmation request 715 along with the recommendation intent query 720 may be presented as part of the user interface 700, such as in the example arrangement shown in FIG. 7. In other embodiments, the recommendation confirmation request 715 and recommendation intent query 720 may be presented in one or more separate user interfaces overlaid on a different, or previous, user interface (e.g., user interface 600 shown in FIG. 6). In such embodiments, the separate, overlaid user interface containing the recommendation confirmation request 715 and recommendation intent query 720 may be of smaller dimensions than the underlying user interface, such that at least a portion of the underlying user interface remains visible.

The recommendation confirmation request 715 may include an identification of the user 725 (e.g., "User 1"), and also a request that anyone other than the user identified 725 log out of the social content network 710. Additionally, the recommendation intent query 720 may identify an application (e.g., Application "XYZ") that was recommended by the identified user 725 (e.g., by the user interacting with the user recommendation control 620 shown in FIG. 6), and include a list of various components included in the recommended application. In at least the example user interface 700, the recommendation intent query 720 lists components of the recommended application along with user-selectable checkboxes 740 configured to allow the user to designate the one or more components of the application that the user intended his or her recommendation to be for. The user interface 700 also may include user-selectable cancel 730 and confirm 735 buttons to allow the user to cancel or confirm the selection of components 705 in the recommendation intent query 720.

FIG. 8 shows an example user interface 800 that includes a confirmation of the user's recommendation 815 within a social content network 810. The user interface 800 includes the one or more components 805 of the recommendation application (e.g., Application "XYZ" 610 shown in the user interface 600 of FIG. 6) determined to be the intended target(s) of the user's recommendation (e.g., by the user making a selection of the intended components in response to the recommendation intent query 720 shown in the user interface 700 of FIG. 7).

In at least some embodiments, the user interface 800 also identifies other users 830 in a social network who have recommended particular components of the application recommended by the user. The other users 830 of the social network are identified along with social annotations 825 that provide details as to the particular one or more components of the application that each user recommended. If the user presented with the user interface 800 (e.g., "User 1") also wishes to recommend one or more other components of the application that one of the other users in the social network 830 has recommended, then the user interface 800 provides user recommendation controls 820 for the user to interact with.

Figure 9:
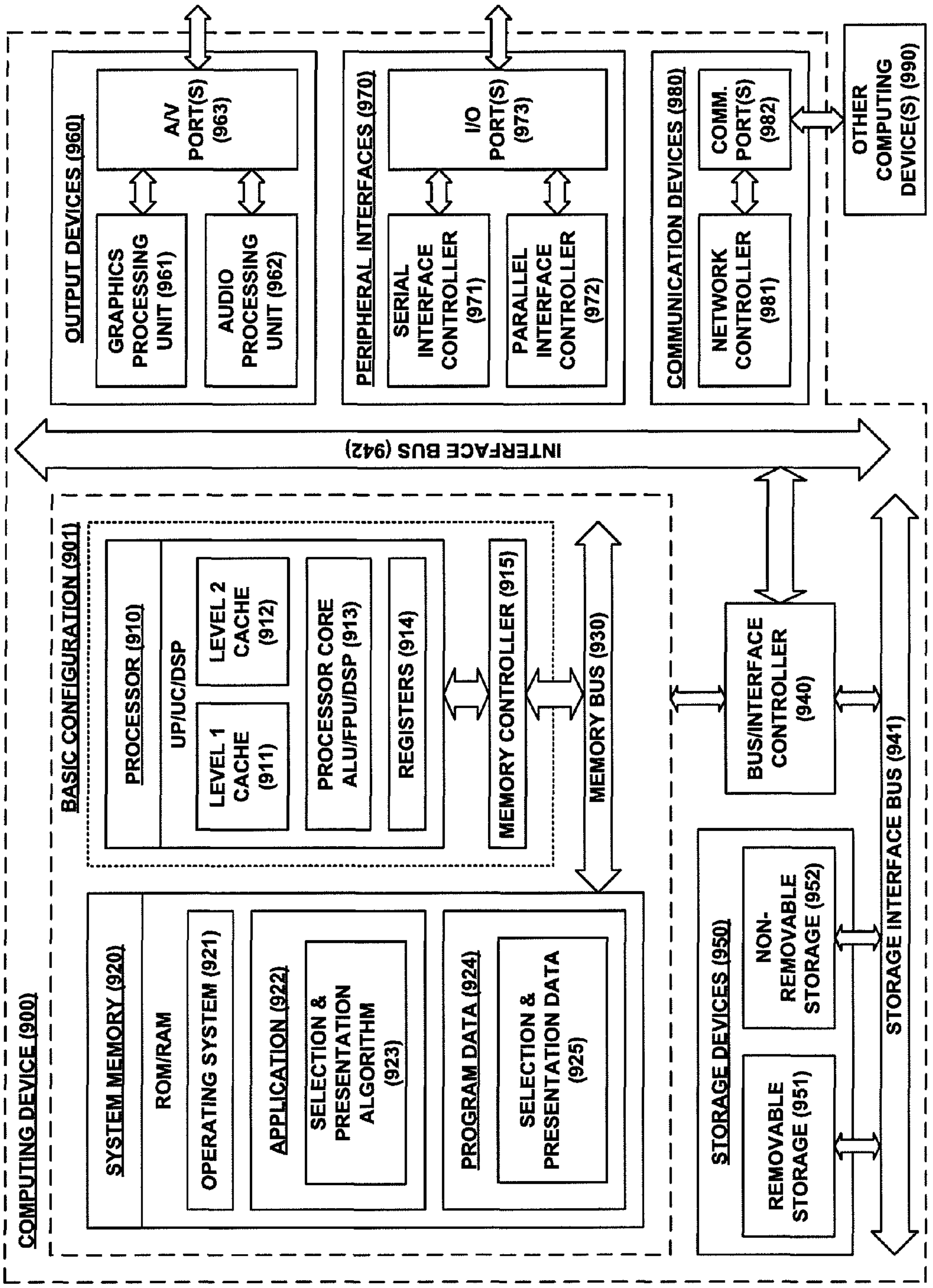
FIG. 9 is a block diagram illustrating an example computing device arranged for selecting and presenting content according to one or more embodiments described herein.

FIG. 9 is a block diagram illustrating an example computing device 900 that is arranged for selecting and presenting an item of content (e.g., a web page, an advertisement, etc.) to a user or user device in accordance with one or more embodiments of the present disclosure. In a very basic configuration 901, computing device 900 typically includes one or more processors 910 and system memory 920. A memory bus 930 may be used for communicating between the processor 910 and the system memory 920.

Depending on the desired configuration, processor 910 can be of any type including but not limited to a microprocessor (μP), a microcontroller (μC), a digital signal processor (DSP), or any combination thereof. Processor 910 may include one or more levels of caching, such as a level one cache 911 and a level two cache 912, a processor core 913, and registers 914. The processor core 913 may include an arithmetic logic unit (ALU), a floating point unit (FPU), a digital signal processing core (DSP Core), or any combination thereof. A memory controller 915 can also be used with the processor 910, or in some embodiments the memory controller 915 can be an internal part of the processor 910.

Depending on the desired configuration, the system memory 920 can be of any type including but not limited to volatile memory (e.g., RAM), non-volatile memory (e.g., ROM, flash memory, etc.) or any combination thereof. System memory 920 typically includes an operating system 921, one or more applications 922, and program data 924. In at least some embodiments, application 922 includes a selection and presentation algorithm 923 that is configured to select a content item, and provide that content item to a user device for presentation to a user. The selection and presentation algorithm is further arranged to identify annotations (e.g., content associated with a social network of a user) for presentation to a user along with the selected content item within the application 922.

Program Data 924 may include selection and presentation data 925. In some embodiments, application 922 can be arranged to operate with program data 924 on an operating system 921 such that a request made by a user of a user device (e.g., user device 105 shown in FIG. 1) is routed via a social network application (e.g., social network application 150 shown in FIG. 1), which acts as a proxy for transmitting such requests to an appropriate server.

Computing device 900 can have additional features and/or functionality, and additional interfaces to facilitate communications between the basic configuration 901 and any required devices and interfaces. For example, a bus/interface controller 940 can be used to facilitate communications between the basic configuration 901 and one or more data storage devices 950 via a storage interface bus 941. The data storage devices 950 can be removable storage devices 951, non-removable storage devices 952, or any combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives and the like. Example computer storage media can include volatile and nonvolatile, removable and non-removable media implemented in any method or technology for storage of information, such as computer readable instructions, data structures, program modules, and/or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of computing device 900.

Computing device 900 can also include an interface bus 942 for facilitating communication from various interface devices (e.g., output interfaces, peripheral interfaces, communication interfaces, etc.) to the basic configuration 901 via the bus/interface controller 940. Example output devices 960 include a graphics processing unit 961 and an audio processing unit 962, either or both of which can be configured to communicate to various external devices such as a display or speakers via one or more A/V ports 963. Example peripheral interfaces 970 include a serial interface controller 971 or a parallel interface controller 972, which can be configured to communicate with external devices such as input devices (e.g., keyboard, mouse, pen, voice input device, touch input device, etc.) or other peripheral devices (e.g., printer, scanner, etc.) via one or more I/O ports 973. An example communication device 980 includes a network controller 981, which can be arranged to facilitate communications with one or more other computing devices 990 over a network communication (not shown) via one or more communication ports 982. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency trade-offs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method comprising:

receiving, at a server, a plurality of identifiers for an application running on a user device, each of the plurality of identifiers being associated with at least one of a plurality of components of the application;

responsive to receiving the plurality of identifiers, generating at least one component reference table based on the plurality of identifiers, the at least one component reference table including, for each of the identifiers, the at least one component of the application associated with the identifier;

receiving an indication that a user selected a user recommendation control in the application running on the user device, the indication including data corresponding to one of the identifiers received for the application;

determining that the user recommended a component of the application based on the at least one component reference table and the data corresponding to the one of the identifiers;

using the data corresponding to the one of the identifiers to determine a group of components of the application associated with the one of the identifiers;

querying the user to select at least one of the group of components applicable to the recommendation;

receiving from the user, in response to the query, a selection corresponding to at least one of the group of components;

generating at least one social annotation based on the selection received from the user; and;

and serving, via a network, the at least one social annotation to a second user device in a format suitable for presentation on the second user device.

2. The method of claim 1, wherein querying the user to select at least one of the group of components applicable to the recommendation includes:

generating a user interface screen identifying the group of components; and providing the user interface screen for presentation to the user.

3. The method of claim 1, wherein the at least one social annotation served to the second user device identifies the at least one of the group of components of the application corresponding to the selection received from the user.

4. The method of claim 1, further comprising:

storing the at least one component reference table for the application; and mapping the at least one component associated with each of the identifiers included in the at least one component reference table to the application.

5. The method of claim 4, wherein the indication that the user selected the user recommendation control is an indication that the user recommended the application, and further comprising:

generating a user interface screen based on the mapped components included in the at least one component reference table stored for the application, the user interface screen identifying the components of the application; and responsive to receiving the indication that the user recommended the application, using the user interface screen to query the user to select at least one of the components applicable to the recommendation.

6. The method of claim 1, further comprising serving, via the network, the at least one social annotation to the second user device in a format suitable for presentation on the second user device, the at least one social annotation identifying the at least one of the group of components of the application corresponding to the selection received from the user.

7. A system comprising:

at least one processor; and a non-transitory computer-readable medium coupled to the at least one processor having instructions stored thereon which, when executed by the at least one processor, causes the at least one processor to:

receive a plurality of identifiers for an application running on a user device, each of the plurality of identifiers being associated with at least one of a plurality of components of the application;

responsive to receiving the plurality of identifiers, generate at least one component reference table based on the plurality of identifiers, the at least one component reference table including, for each of the identifiers, the at least one component of the application associated with the identifier;

receive an indication that a user selected a user recommendation control in the application running on the user device, the indication including data corresponding to one of the identifiers received for the application;

determine that the user recommended a component of the application based on the at least one component reference table and the data corresponding to the one of the identifiers;

use the data corresponding to the one of the identifiers to determine a group of components of the application associated with the one of the identifiers;

query the user to select at least one of the group of components applicable to the recommendation;

receive from the user, in response to the query, a selection corresponding to at least one of the group of components;

generate at least one social annotation based on the selection received from the user; and serve, via a network, the at least one social annotation to a second user device in a format suitable for presentation on the second user device.

8. The system of claim 7, wherein the at least one processor is further caused to:

generate a user interface screen identifying the group of components; and provide the user interface screen for presentation to the user.

9. The system of claim 7, wherein the at least one social annotation served to the second user device identifies the at least one of the group of components of the application corresponding to the selection received from the user.

10. The system of claim 7, wherein the at least one processor is further caused to:

store the at least one component reference table for the application; and map the at least one component associated with each of the identifiers included in the at least one component reference table to the application.

11. The system of claim 10, wherein the indication that the user selected the user recommendation control is an indication that the user recommended the application, and wherein the at least one processor is further caused to:

generate a user interface screen based on the mapped components included in the at least one component reference table stored for the application, the user interface screen identifying the components of the application; and responsive to receiving the indication that the user recommended the application, use the user interface screen to query the user to select at least one of the components applicable to the recommendation.

12. The system of claim 7, wherein the at least one processor is further caused to:

serve, via the network, the at least one social annotation to the second user device in a format suitable for presentation on the second user device, the at least one social annotation identifying the at least one of the group of components of the application corresponding to the selection received from the user.

13. A method comprising:

receiving, at a server, an indication that a user selected a user recommendation control in an application running on a user device, the application including a plurality of components;

traversing a view hierarchy of the application to determine a view of the application containing the selected user recommendation control;

determining that the user recommended at least one of the plurality of components of the application based on the view of the application containing the selected user recommendation control;

identifying a group of components of the application based on the view of the application containing the selected user recommendation control;

querying the user to select at least one of the group of components applicable to the recommendation;

receiving from the user, in response to the query, a selection corresponding to at least one of the group of components;

generating at least one social annotation based on the selection received from the user; and serving, via a network, the at least one social annotation to a second user device in a format suitable for presentation on the second user device.

14. The method of claim 13, wherein querying the user to select at least one of the group of components applicable to the recommendation includes:

responsive to identifying the group of components based on the view of the application containing the selected user recommendation control, generating a user interface screen identifying the group of components; and providing the user interface screen for presentation to the user.

15. The method of claim 13, further comprising:

identifying a plurality of views of the application based on the traversed view hierarchy, wherein each of the plurality of views contains at least one of the plurality of components of the application;

generating at least one component reference table for the application, the at least one component reference table including, for each of the plurality of views, the at least one component of the application contained in the view; and storing the at least one component reference table generated for the application.

16. The method of claim 15, further comprising mapping the at least one component contained in each of the plurality of views included in the at least one component reference table to the application running on the user device.

17. The method of claim 13, further comprising serving, via the network, the at least one social annotation to the second user device in a format suitable for presentation on the second user device, the at least one social annotation identifying the at least one of the group of components of the application corresponding to the selection received from the user.

18. A system comprising:

at least one processor; and a non-transitory computer-readable medium coupled to the at least one processor having instructions stored thereon which, when executed by the at least one processor, causes the at least one processor to:

receive an indication that a user selected a user recommendation control in an application running on a user device, the application including a plurality of components;

traverse a view hierarchy of the application to determine a view of the application containing the selected user recommendation control;

determine that the user recommended at least one of the plurality of components of the application based on the view of the application containing the selected user recommendation control;

identify a group of components of the application based on the view of the application containing the selected user recommendation control;

query the user to select at least one of the group of components applicable to the recommendation;

receive from the user, in response to the query, a selection corresponding to at least one of the group of components;

generate at least one social annotation based on the selection received from the user; and serve, via a network, the at least one social annotation to a second user device in a format suitable for presentation on the second user device.

19. The system of claim 18, wherein the at least one processor is further caused to:

responsive to identifying the group of components based on the view of the application containing the selected user recommendation control, generate a user interface screen identifying the group of components; and provide the user interface screen for presentation to the user.

20. The system of claim 18, wherein the at least one processor is further caused to:

identify a plurality of views of the application based on the traversed view hierarchy, wherein each of the plurality of views contains at least one of the plurality of components of the application;

generate at least one component reference table for the application, the at least one component reference table including, for each of the plurality of views, the at least one component of the application contained in the view; and store the at least one component reference table generated for the application.

21. The system of claim 20, wherein the at least one processor is further caused to:

map the at least one component contained in each of the plurality of views included in the at least one component reference table to the application running on the user device.

22. The system of claim 18, wherein the at least one processor is further caused to:

serve, via the network, the at least one social annotation to the second user device in a format suitable for presentation on the second user device, the at least one social annotation identifying the at least one of the group of components of the application corresponding to the selection received from the user.

* * * * *